No. 890,579. PATENTED JUNE 9, 1908.
C. E. STORM.
STALK STRIPPING MECHANISM FOR CORN HARVESTERS.
APPLICATION FILED OCT. 16, 1907.
2 SHEETS—SHEET 1.
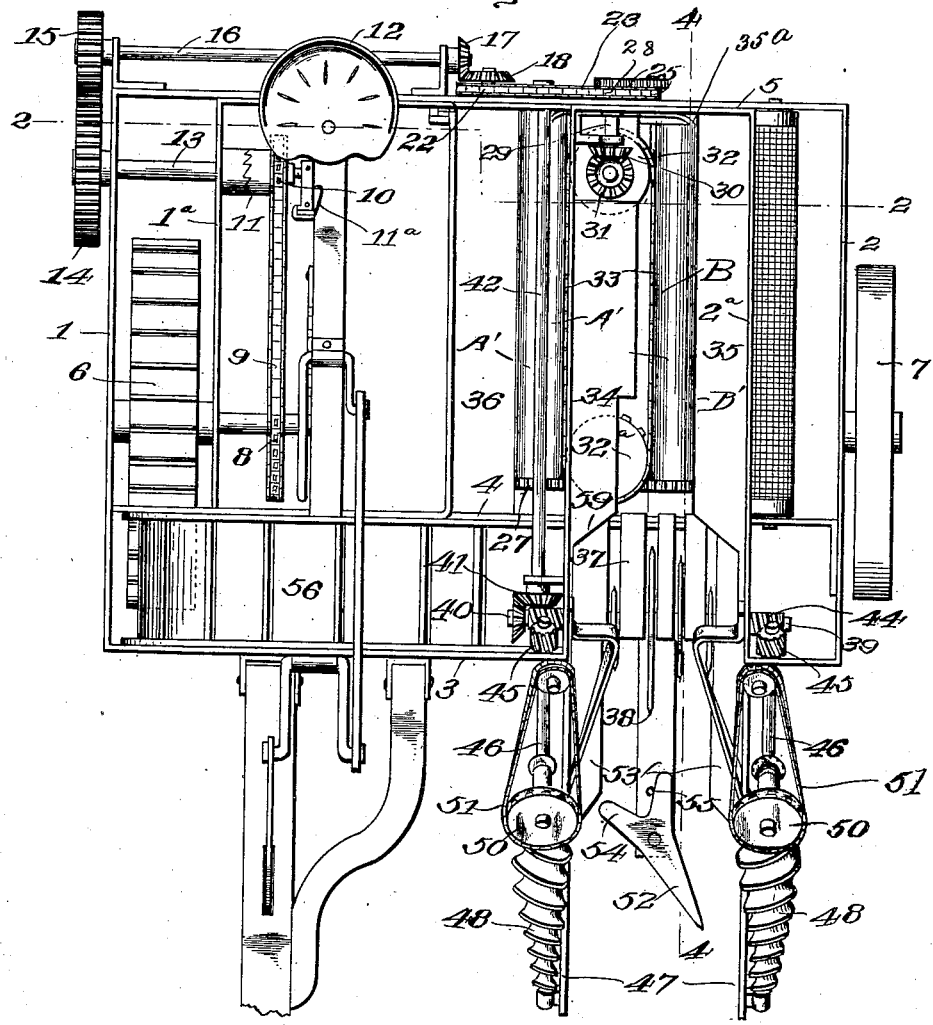
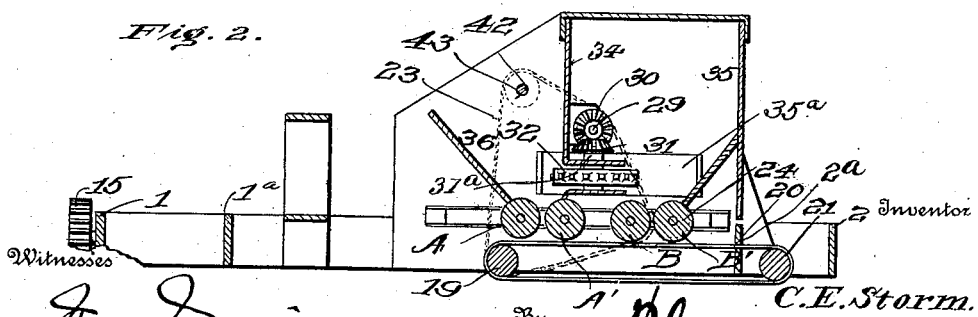

No. 890,579.
PATENTED JUNE 9, 1908.
C. E. STORM.
STALK STRIPPING MECHANISM FOR CORN HARVESTERS.
APPLICATION FILED OCT. 16, 1907.
2 SHEETS—SHEET 2.
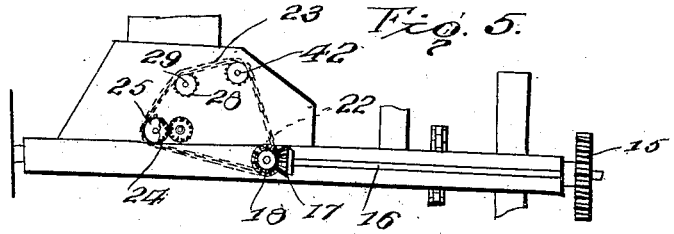
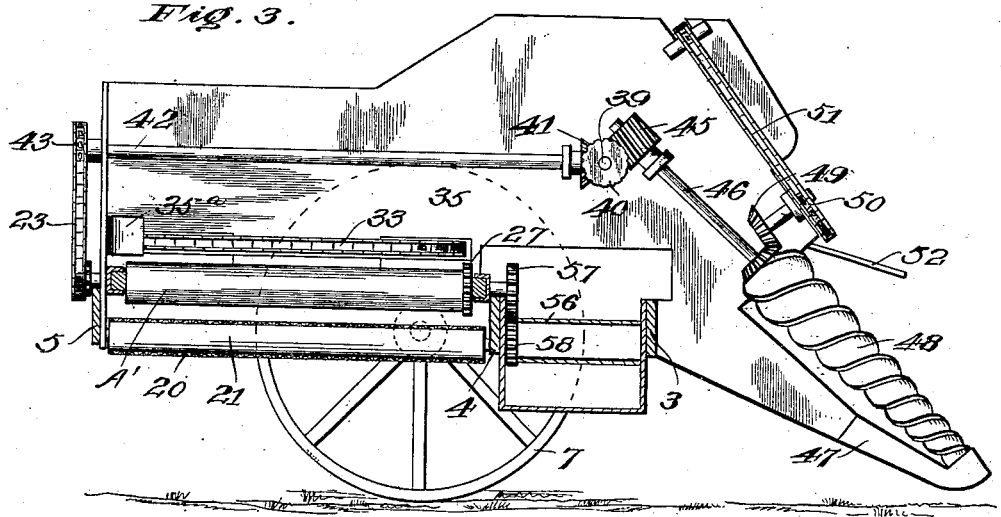
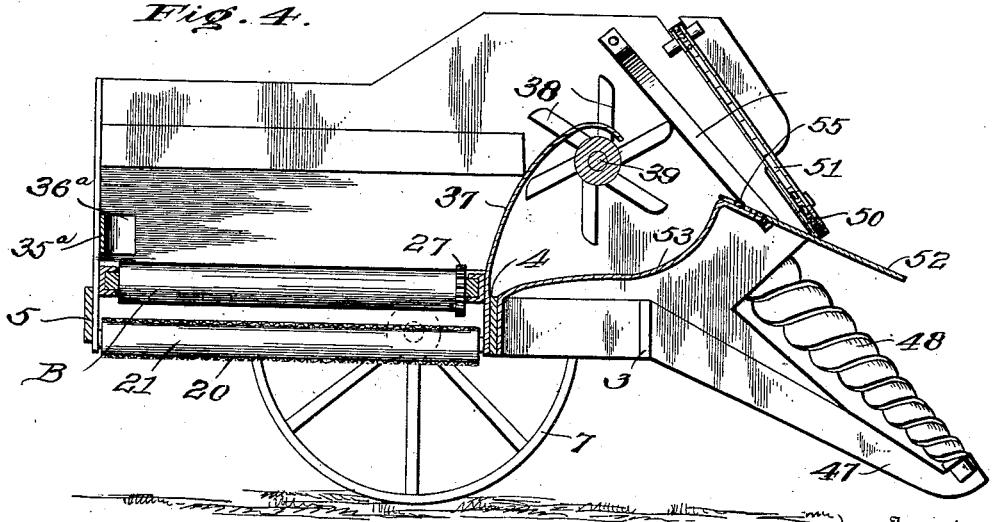
Witnesses
Inventor
C. E. Storm.
By
Attorneys

UNITED STATES PATENT OFFICE.

CHARLES E. STORM, OF TROWBRIDGE, ILLINOIS.

STALK-STRIPPING MECHANISM FOR CORN-HARVESTERS.

No. 890,579. Specification of Letters Patent. Patented June 9, 1908.

Original application filed March 21, 1907, Serial No. 363,637. Divided and this application filed October 16, 1907. Serial No. 397,692.

*To all whom it may concern:*

Be it known that I, CHARLES E. STORM, a citizen of the United States, residing at Trowbridge, in the county of Shelby and State of Illinois, have invented certain new and useful Improvements in Stalk-Stripping Mechanisms for Corn-Harvesters, of which the following is a specification.

This invention contemplates certain new and useful improvements in corn harvesting machines, and the present invention relates particularly to the mechanism for stripping the ears of corn from the stalk in the field, the present case being a divisional application of my former application for Letters Patent of the United States, Serial No. 363,637, filed on or about March 21, 1907.

For a full understanding of the invention reference is to be had to the following description and accompanying drawings, in which:

Figure 1 is a top plan view of my improved corn harvesting machine. Fig. 2 is a transverse sectional view thereof on the line 2—2 of Fig. 1. Figs. 3 and 4 are longitudinal sectional views on the lines 3—3 and 4—4 respectively of Fig. 1. Fig. 5 is a view looking at the rear of the machine.

Corresponding and like parts are referred to in the following description and indicated in all the views of the drawings by the same reference characters.

The frame work of my improved corn harvesting machine may be of any general structure, such as is common or suitable for a machine to travel over the fields, and in the present instance, the said framework embodies longitudinal sills or bars 1, 1$^a$, 2, 2$^a$, and front, intermediate and rear cross bars 3, 4, and 5. 6 and 7 designate the traveling wheels which are journaled in the framework, the traveling wheel 6 being the driving or power wheel. To this end the axle of said wheel is provided with a sprocket 8 which is operatively connected by a chain 9 to the sprocket 10 formed with a clutch 11 adapted to be actuated by any form of hand lever 11$^a$ or the like from the driver's seat 12 so as to couple and uncouple the sprocket 10 to and from the shaft 13 on which it is mounted. At its outer end the shaft 13 carries a spur gear 14 which meshes with a spur pinion 15 on one end of the transversely extending shaft 16 journaled at the rear of the framework. The other end of the shaft 16 carries the bevel pinion 17 meshing with a similar pinion 18 on the shaft of the roller 19. This roller extends longitudinally about the middle of the framework and forms one supporting member of the transversely movable endless apron 20 which preferably is composed of leather belts and transversely spaced wires connected thereto and which is provided with a complemental roller 21.

Above the apron 20, four husking rolls A, A', B, B', are journaled in the framework and extend longitudinally thereof. The shaft of the roller 19 carries a sprocket wheel 22 at its rear end and over said wheel there passes a chain 23 which engages a sprocket wheel 24 on the shaft of the husking roll B so as to drive such roll. The shaft of the husking roll B carries a spur pinion 25 meshing with a similar pinion on the adjacent roll A, and the opposite ends of all the rolls carry meshing pinions 27. Hence, as they rotate the rolls A, A' will turn toward each other, as will the other rolls B, B', in a manner to husk the ears of corn and drag the husks downwardly on to the transversely traveling apron 20, whence they will pass to the side and fall to the ground, while any grains of corn that may happen to be broken off in the husking operation fall between the wires of the apron and may be caught by any desired receptacle or conveyer (not shown). The chain 23 at the rear of the framework also passes over a sprocket wheel 28 on a stub shaft 29 and said shaft carries at its front end a bevel pinion 30 meshing with the similar pinion 31 on the shaft 31$^a$ which carries the sprocket wheel 32 and which is journaled in suitable brackets and mounted to turn about a vertical axis. An endless sprocket carrier 33 passes over the sprocket 32 and a similar sprocket 32$^a$ in advance of the sprocket 32, and in longitudinal alinement therewith and both of these sprockets project outwardly over the two pairs of husking rollers and from a partition 34 which stands between two troughs 35, 36, one alongside of the other. As the sprocket carrier 33 travels rearwardly, it is obvious that it will engage the ears of corn entering the feed end of the trough 35 and it will thence be caused to travel rearwardly along the husking rolls to the rear end of said trough whence it will be deflected laterally by means of a curve plate 35$^a$ and passed through an opening 36$^a$ in the partition 34 and receive a further action by the rolls A, A'. Hence, by a very compact arrangement, the corn will be treated by two pairs of husking rolls and a thorough stripping of the husks effected.

The foregoing parts relate mainly to husking mechanism, which is the subject of my other application before referred to, and I shall now describe the stalk stripping mechanism which forms the basis of the present case.

Spaced fingers 37 project upwardly and forwardly from the receiving end of the trough 35 (this being the receiving trough and the trough 36 the discharging trough), and cutters or snappers 38 in the form of segmental blades, revolve in vertical planes in the spaces between said fingers 37, said cutters being mounted upon the transversely extending shaft 39 journaled in the side walls of the receiving trough. In order to drive the cutters or snapping fingers 38, the shaft 39 is provided at one end with a bevel pinion 40 that meshes with a similar pinion 41 on a longitudinal shaft 42 extending rearwardly above the discharge trough 36. At its rear end, the shaft 42 carries a sprocket 43 which is driven by means of the sprocket chain 23 above mentioned.

The shaft 39 is provided at its ends, outside of the receiving trough, with worms 44 meshing with worm gears 45 on the oblique shafts 46 which are journaled in the sides of the trough and at their lower ends in step bearings in the forwardly extending curved shoes 47. The shafts 46 carry the spiral guards 48 which effectively serve the purpose of taking up the stalks of corn that may be prostrate and carrying them upwardly for action by the feeding chain 51. In order to drive the feeding chains 51, I mount them upon upper and lower sprocket wheels 50, the lower sprocket wheels being mounted on stub shafts 49 that receive their motion by means of a bevel pinion connecting with the shafts 46.

52 designates a pointer which is pivotally mounted intermediate of its ends on the intermediate one of three forwardly extending spaced tongues 53 projecting from the bottom of the receiving trough 35. The pointer 52 is deflected slightly in a downward direction on the intermediate tongue, and the rear end of the pointer is forked as indicated at 54. Either member of this fork is designed to engage with a stop 55. By turning this pointer to the right, the machine will feed the hill on the left, while, if it be turned to the opposite limit of its movement, it will feed the machine with the hills to the right. As the corn is husked and passes forwardly out of the front end of the discharge trough 36, it will be caught up and carried into a wagon or other receptacle alongside of the machine, by means of a transversely extending elevator 56, which is driven by means of a spur pinion 57 on the front end of the shaft of roller 19 and a similar meshing pinion 58 on the lower elevator roller.

In the practical operation of my improved corn husking machine, as the machine is drawn over the fields, the auger guards 48 will bring up any stalks that have fallen down and all the stalks will be fed (as directed by the pointer 52) to the feed chains 51. As the corn is fed rearwardly, it passes into the mouth of the receiving trough 35 which is contracted (by means of plates or strips 59 as shown) and the ears are stripped from the stalks by means of the strippers or cutters 38, which act on the ears in an upward direction. The ears then fall upon the adjacent pair of husking rolls B, B' and the husks are stripped from the ears while they are fed continuously back by means of a sprocket carrier 33, and thence passed laterally into the other trough 36 and forwardly again by the same sprocket carrier to receive additional action by the other set of husking rolls A, A'. The ears are finally, as has been before stated, carried upwardly by means of an elevator 56 and deposited wherever desired.

Having thus described the invention, what is claimed as new is:

1. In a corn harvesting machine, side guards and a tongue between said guards, and a pointer pivotally mounted intermediate of its ends on said tongue with one end projecting forwardly therefrom, the tongue being provided with a stop adapted for engagement with said pointer to hold the latter in a deflected relation to either side guard.

2. In a corn harvesting machine, and in combination with the stalk stripping and husking mechanisms, side guards and a tongue between said guards, and a pointer pivotally mounted on said tongue and projecting forwardly therefrom, said pointer being provided with a rear forked end and the tongue being provided with a stop adapted for engagement with either of said forked members.

3. A corn harvesting machine, comprising a support embodying traveling wheels, feed mechanism including a pair of auger side guards, and a pair of feed chains mounted above said guards and in juxtaposition thereto, means for simultaneously driving said guards and chains, stalk stripping mechanism at the rear of said chains, a trough within which said stripping mechanism is mounted, means for driving said stripping mechanism, husking rollers extending longitudinally of the framework and located at the bottom of said trough, means for feeding ears rearwardly along the husking rollers, and means for driving the last named feeding means and husking rolls from one of said traveling wheels.

In testimony whereof I affix my signature in presence of two witnesses.

CHARLES E. STORM. [L. S.]

Witnesses:
MARTIN KULL,
FRANK PRICE.